Nov. 15, 1955 C. E. HARRIS 2,723,674

TELEPHONE CABLEMAN'S TENT

Filed Nov. 28, 1951 4 Sheets-Sheet 1

INVENTOR

Charles E. Harris

BY L. Donald Myers

ATTORNEY

TELEPHONE CABLEMAN'S TENT

Filed Nov. 28, 1951 4 Sheets-Sheet 2

INVENTOR

Charles E. Harris

BY L. Donald Myers

ATTORNEY

Nov. 15, 1955 C. E. HARRIS 2,723,674

TELEPHONE CABLEMAN'S TENT

Filed Nov. 28, 1951 4 Sheets-Sheet 3

INVENTOR

Charles E. Harris

BY [signature]

ATTORNEY

Nov. 15, 1955 C. E. HARRIS 2,723,674

TELEPHONE CABLEMAN'S TENT

Filed Nov. 28, 1951 4 Sheets-Sheet 4

INVENTOR

Charles E. Harris

BY L. Donald Myers

ATTORNEY 2,723,674

TELEPHONE CABLEMAN'S TENT

Charles E. Harris, Topeka, Kans.

Application November 28, 1951, Serial No. 258,662

8 Claims. (Cl. 135—4)

This invention relates to new and useful improvements in a telephone cableman's repair tent.

In making repairs to multiple wire telephone cables that are strung on poles, it is necessary for the cableman to remove the protective covering and open up or expand the many wires, which are thus exposed and which form the core of the cable, to obtain access to the defective wire or wires. This type of service must be performed under absolutely dry working conditions to prevent the exposed wires from becoming shorted, or otherwise damaged, by dampness. Frequently, emergency repairs must be effected during stormy weather which makes necessary the use of some form of waterproof covering, or tent, to protect the exposed wires.

If the repair work is performed at a location spaced a substantial distance from the nearest cable supporting pole, the cableman must work either from a ladder, or a tower truck with the waterproof covering, if one is being used, thrown over his head. Supported in this manner, the covering hampers the cableman's movements to a considerable extent and makes the performance of his work substantially more difficult.

It is the primary object of this invention to provide a tent for use by a telephone cableman the frame of which can be fastened at one side directly to the cable being repaired and at the other side to either a ladder or a truck tower, depending on which type of support is being used by the cableman.

A further important object of the invention is to provide a telephone cableman's tent which can be fastened to a cable, or the like, so as to provide the desired amount of free head room for the cableman and so as to cover different lengths of the cable, and which can be adjusted, while fastened to a cable, or the like, so as to either overlie the cable or occupy a position on either side of the cable.

Still another object of the invention is to provide a tent of the above mentioned type which can be collapsed and rolled up into a compact bundle when not in use.

Other objects and advantages of the invention will be apparent during the course of the following description.

Figure 2:
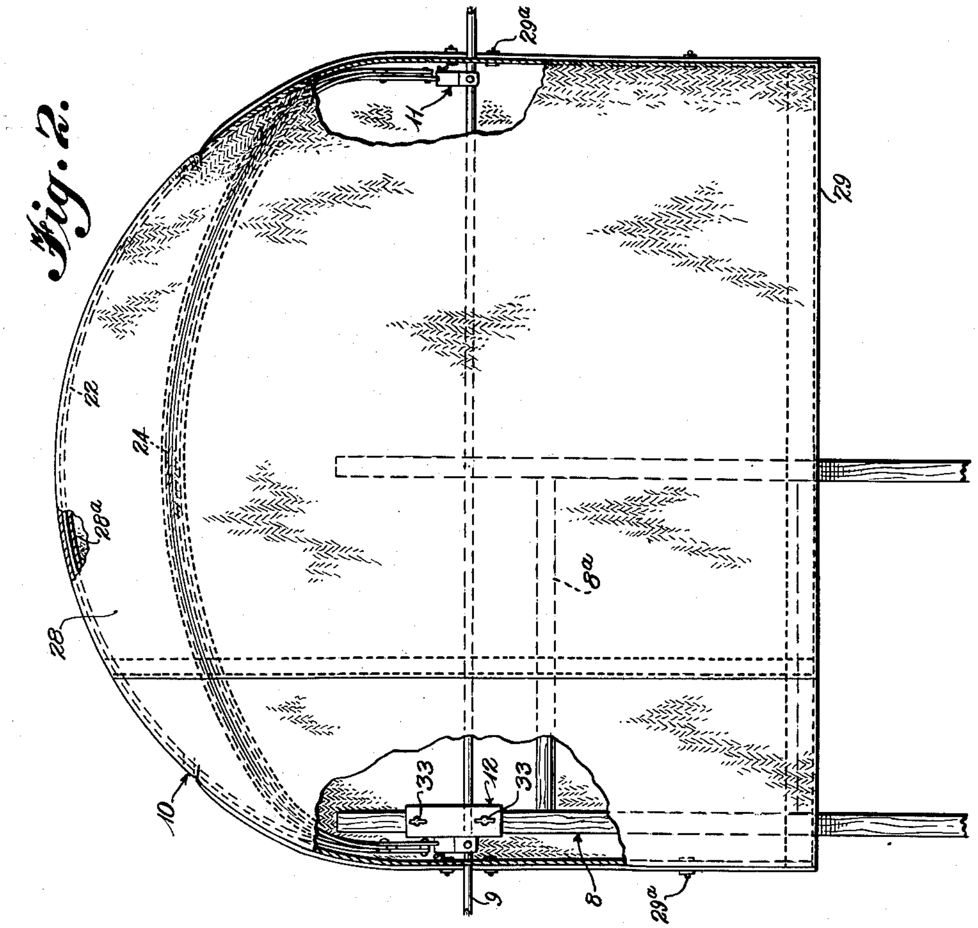
Figure 1:
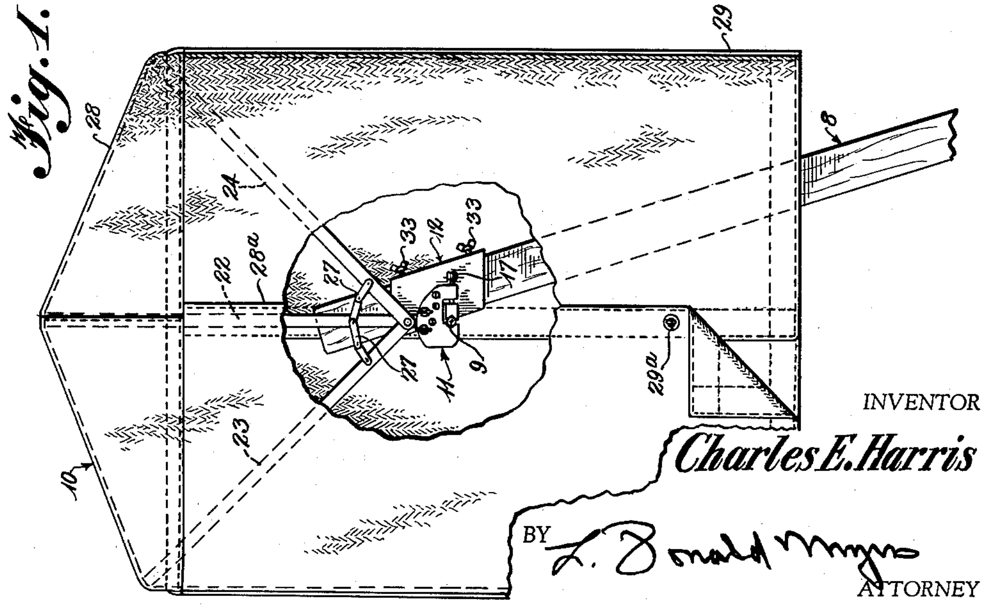
Figures 3, 4, 5, 6:
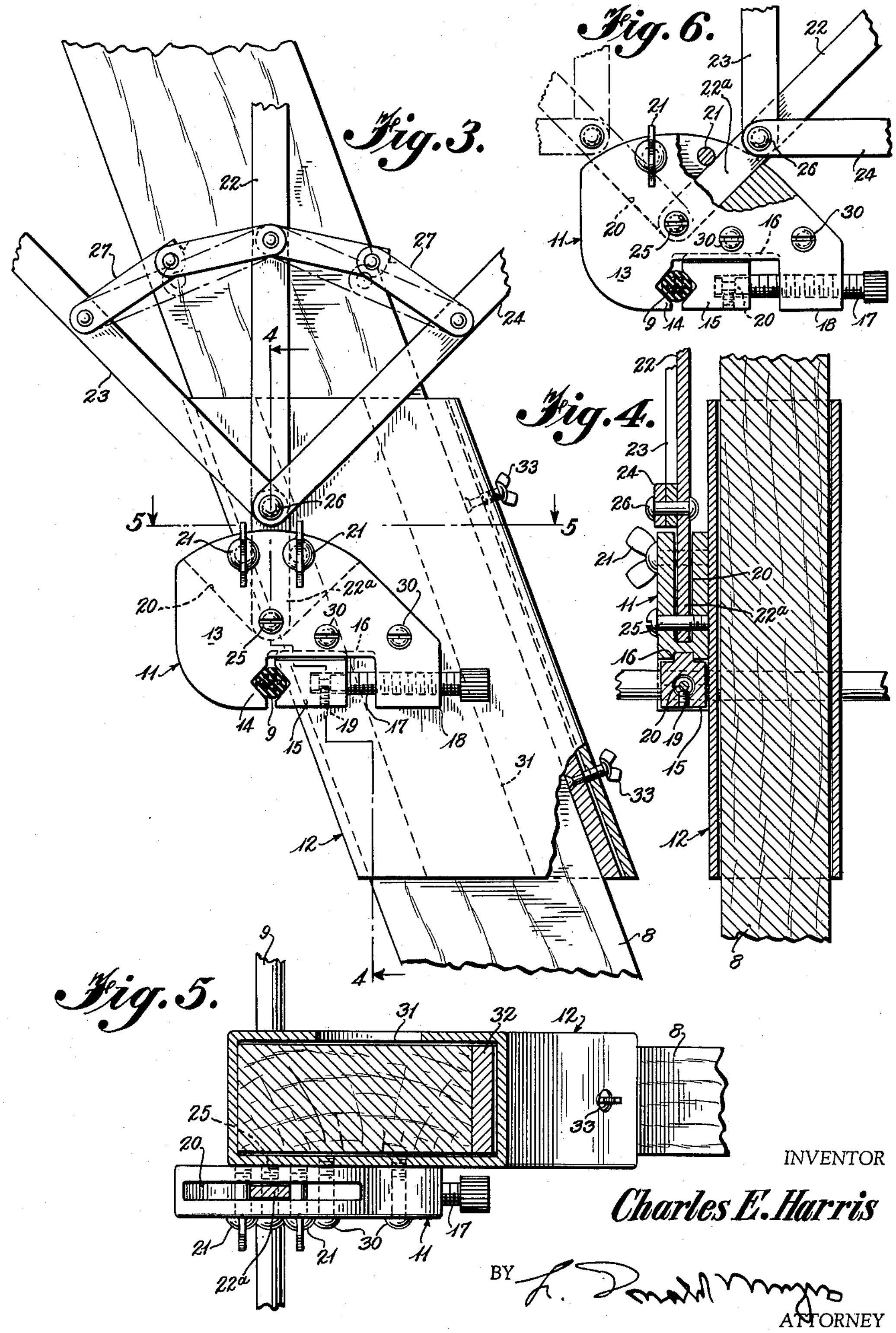
Figures 7, 8:
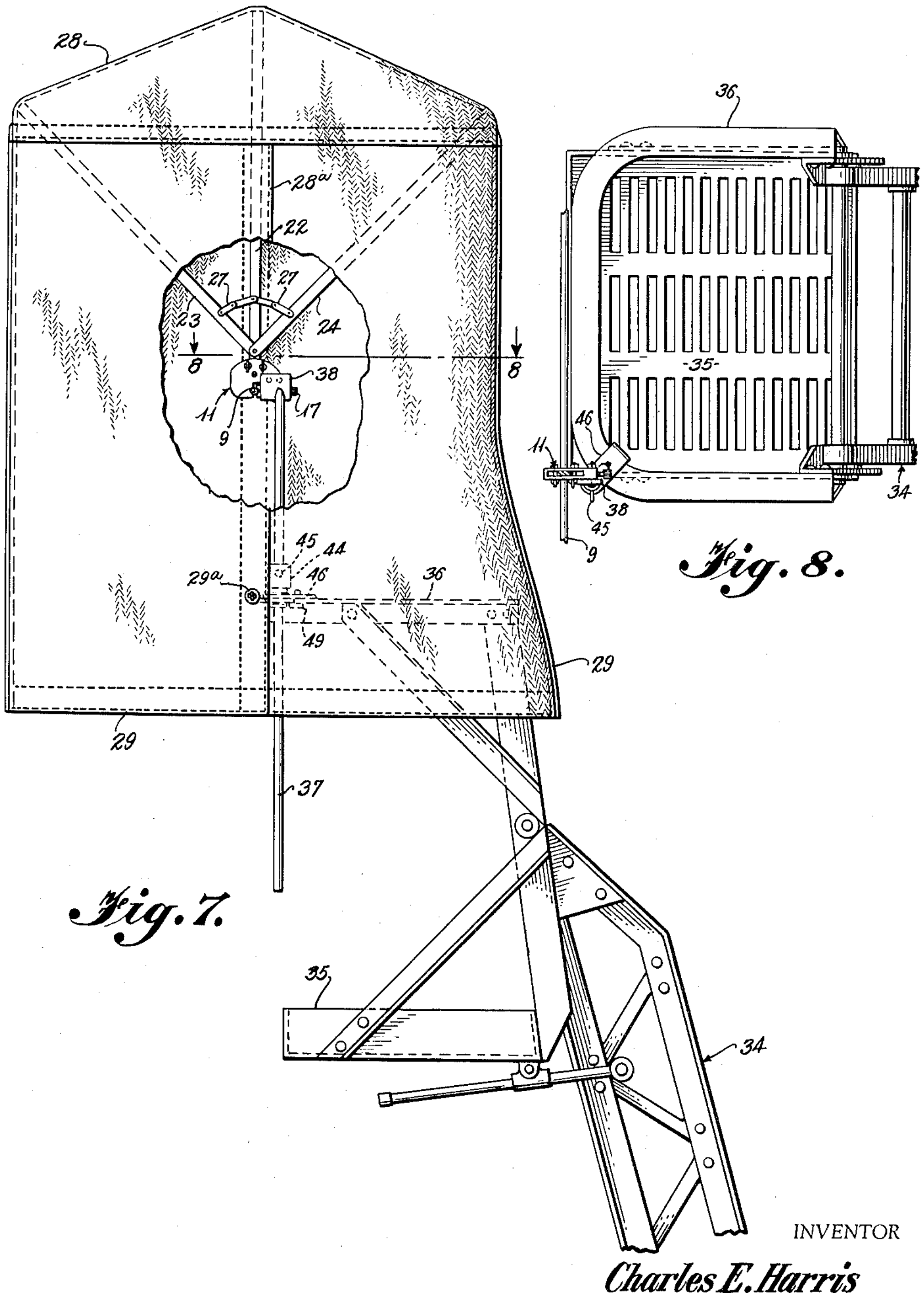
Figures 9, 10, 11:
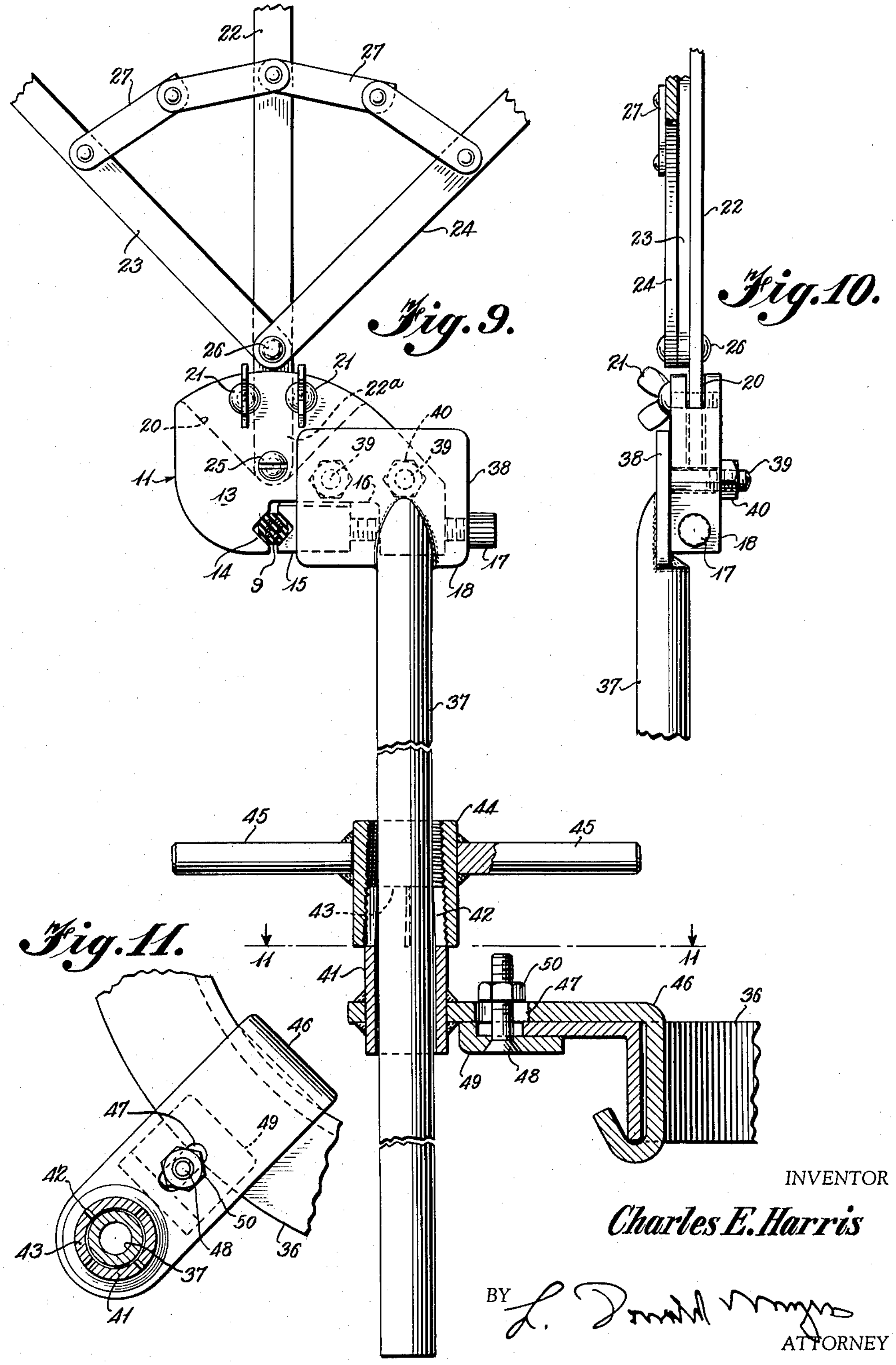

In the accompanying drawings forming a part of this specification and in which like numerals are employed to designate like parts throughout the same, Figure 1 is an end elevational view of the telephone cableman's tent embodying this invention and associated with a ladder, Figure 2 is a side elevational view, partly broken away, of the tent illustrated in Fig. 1, Figure 3 is a detail, end elevational view of a portion of the collapsible tent frame with one end clamp that is employed for attaching the tent frame to a cable, or the like, and a connecting sleeve employed for attaching the tent clamp to a cableman's ladder, Figure 4 is a vertical sectional view, taken on line 4—4 of Fig. 3, Figure 5 is a horizontal sectional view taken on line 5—5 of Fig. 3, Figure 6 is a detail end elevational view of one of the end clamps for the tent frame, and illustrating the frame arranged in two of its permissible positions of adjustment, Figure 7 is a similar view to Fig. 1 but illustrates the cableman's tent associated with the platform of a conventional tower truck, Figure 8 is a horizontal view taken on line 8—8 of Fig. 7, Figure 9 is a similar view to Fig. 3 but illustrating the details of the adapter mechanism shown in Fig. 7 as being used for associating the tent with a tower truck platform, Figure 10 is a detail view, taken at right angles to Fig. 9, and Figure 11 is a horizontal sectional view taken on line 11—11 of Fig. 9.

In the drawings, wherein for the purpose of illustration is shown the preferred embodiments of this invention, and first particularly referring to Figs. 1 and 2, the reference character 8 designates a ladder, placed against the telephone cable 9 that is to be repaired, on which the cableman may stand while he is working on the cable. The tent structure embodying this invention is illustrated in these two figures as being positioned to overlie the telephone cable 9 that is to be repaired. This tent 10 is bowed or arched longitudinally and is fastened at its opposite ends to desired spaced portions of the telephone cable 9 by the duplicate clamps 11. In these two figures, the left-hand clamp 11 is illustrated as being attached to a sleeve 12 employed for fastening the tent 10 to the adjacent side piece of the ladder 8. It, also, will be appreciated that the connection of the sleeve 12 to the clamp 11 and the fastening of the clamp to the telephone cable 9 will perform the further function of anchoring the upper end portion of the ladder 8 to the said cable.

By referring particularly to Figs. 3 and 6, inclusive, it will be seen that each one of the clamps 11 is of substantially C-shape and includes a body portion 13 formed with a stationary jaw 14 for gripping one side of the telephone cable 9. A movable jaw 15 is oppositely positioned with reference to the stationary jaw 14 for gripping the other side of the cable and is adapted to be guided in its longitudinal movement relative to the stationary jaw 14 by the tongue and groove 16 which is formed partly on the adjustable jaw 15 and partly in the main body of the clamp 13. An adjusting screw 17 is threadedly connected to the end portion 18 of the clamp body and is rotatably connected to the adjustable jaw 15 by the set screw 19.

One of the tent frame clamps 11 is best illustrated in Figs. 3, 4 and 5 as having formed therein a V-shaped slot or groove 20 which enters the clamp body from its top. Threaded through this grooved or slotted portion of the clamp body are the two transversely spaced wing screws 21. These elements perform a particular function to be described at a later point.

The tent frame is formed of three flexible strips which will be identified as a central strip 22, a side strip 23 that lies next to the center strip, and a side strip 24 that lies outside of the side strip 23. The center strip 22 is longer than the two side strips so that its opposite end portions **22*a* may be inserted in the slots or grooves 20 of the two clamps 11. Screws 25 are employed for pivotally anchoring the end portions of the central strip 22 in the slots or grooves 20**.

It will be seen by particularly inspecting Figs. 1 to 4 that the opposite extremities of the strips 23 and 24 are superimposed relative to each other and relative to the associated portions of the center strip and are pivotally connected by the rivets 26. Because of this superimposed relationship, the three tent frame strips can only be bowed lengthwise when the side strips 23 and 24 are fanned outwardly or are expanded in opposite directions relative to the center strip. Conversely, the tent frame can only be completely collapsed, or folded together, so that the three strips will be superimposed throughout their lengths, when the strips are straight or unbowed.

To retain the tent frame in its expanded or fanned-out condition, toggle joints 27 are provided and are connected to the strips 22, 23 and 24 in the manner best illustrated in Figs. 1 and 3. It will be appreciated that toggle joints 27 may be provided for both end portions of the tent frame, if so desired, but the use of toggle joints at only one end is all that is absolutely necessary. The toggle joints are illustrated in full-lines in Fig. 3, with the joints broken, or conditioned for collapsing of the tent frame, and in broken-lines with the joints locked to hold the frame against collapsing.

Figs. 3, 4, and 5 illustrate the wing screws 21 as being positioned on opposite sides of the end portion 22*a* of the center frame strip 22. When thus associated, the wing screws will hold the tent frame in its uppermost position, or with the frame overlying the telephone cable 9. Fig. 6 illustrates the tent frame in two lateral positions. The tent frame may be moved into its lateral full-line position by unscrewing and removing the right-hand wing screw 21 and then replacing this screw to retain the tent frame in this adjusted position. The frame may be moved into its broken-line position by similarly manipulating the left-hand screw 21.

Figs. 1 and 2 illustrate the frame as being covered by a suitable waterproof fabric tent 28. This covering may be suitably attached to the associated portions of the three frame strips 22, 23 and 24 in any desired manner, such as by means of the casing 28*a*. Depending side curtain portions 29 are provided for the opposite sides of the tent to further shield the cableman and the telephone cable from the elements. Suitably located snap fasteners 29*a* may be provided for connecting the associated edges of the side curtain portions 29.

By particularly inspecting Figs. 3, 4 and 5, it will be seen that a substantially C-shaped sleeve 12 is fitted over one side piece of the ladder 8, and is fastened to the adjacent tent frame clamp 11 by means of the two screws 30. The longitudinal opening 31 that is formed in the inner side of the sleeve 12 is provided to accommodate the rungs 8*a* of the ladder. A clamping plate 32 is positioned within the bore of the sleeve 12 and is adjusted by means of the wing screws 33 into positions for clamping and releasing the sleeve relative to the ladder side piece.

It will be appreciated that when the tent is not in use, and is disconnected from the telephone cable 9, and the ladder 8, the frame strips 22, 23 and 24 may be arranged in superimposed relation lengthwise and the strips may then be rolled up in the covering 28 to form a straight flat bundle.

Referring now to the modified form of the invention shown in Figs. 7 to 11, inclusive, it is to be understood that the same tent structure is used, including the two C-shaped clamps 11, the tent frame with its three flexible strips 22, 23, and 24, and the waterproof fabric covering or tent 28. Therefore, the same reference characters will be applied to the corresponding parts. The following detail description will cover only the structural elements which are employed to adapt the cableman's tent for use with a standard tower truck:

The reference character 34 refers generally to the upper portion of the tower of a conventional cableman's tower truck which includes the platform 35 on which the cableman stands while making repairs to a telephone cable. The platform is provided with a railing 36, formed of angle-iron or the like, to which one of the C-shaped clamps 11 is suitably connected by the structural elements which now will be described in detail.

A standard 37 has suitable fastened to its upper end the head or mounting plate 38 which is provided with the two lateral screws 39 that are spaced to enter the two holes formed in the body of one of the clamps 11. Nuts 40 are tightened on the screws 39 to rigidly attach the clamp 11 to the standard 37.

The standard 37 may be of any desired length so that it may be connected to the railing 36 of the cableman's platform 35 and vertically adjusted to take care of differences in elevation between the telephone cable 9 and the platform railing 36. To effect this adjustment, the body of the standard is passed through the bore of the sleeve 41 which is formed with a suitable number of slits 42 at its upper end portion to form gripping tongues 43. The tongues are externally screw threaded to cooperate with the internally screw threaded and tapered bore of the clamping sleeve 44. Adjustment of the sleeve 44 is effected by the handles 45.

The lower end portion of the sleeve 41 is welded to one end portion of a hook-shaped clamp 46 that fits partially around the angle-iron railing 36 of the tower platform 35, as best illustrated in Figs. 9 and 11. Adjacent the sleeve 41, the clamp 46 is formed with a slot 47 to accommodate the bolt 48 employed to connect and tighten the lug 49 relative to the clamp 46. The bolt 48 is provided with a nut 50 to effect this desired result. Fig. 9 illustrates the manner in which the lug 49 cooperates with the clamp 46 to rigidly secure the standard mounting sleeve 41 to the railing 36.

It will be understood that when one end of the tent frame is securely fastened to the cable 9 by means of the clamp 11 which is connected to the standard 37, supported by the platform railing 36, and the other end of the tent frame is securely fastened to the cable 9 by the second clamp 11, in the manner best illustrated in Fig. 2, the tent will be held in the desired position to enable the cableman to perform the desired work on the cable.

It is to be understood that the forms of this invention herewith shown and described are to be taken as the preferred examples of the same, and that various changes in the shape, size, and arrangement of parts may be resorted to without departing from the spirit of the invention or the scope of the subjoined claims.

Having thus described the invention, I claim:

1. A telephone cableman's tent, comprising an expansible and collapsible frame formed of a plurality of substantially coextensive, longitudinally superimposed flexible strips, means pivotally connecting the adjacent end portions of said strips to permit the latter to fan out when bowed lengthwise, a fabric member fastened to the strips and covering the frame when the latter is expanded by bowing and fanning the strips, a clamp attached to each end portion of the frame for fastening the expanded frame to a telephone cable, or the like, a sleeve for receiving and clamping a side piece of a ladder resting against the cable, and means for attaching the sleeve to one of the end clamps to connect the tent frame to the ladder and the ladder to the cable.

2. A telephone cableman's tent, comprising an expansible and collapsible frame formed of a plurality of substantially coextensive, longitudinally superimposed flexible strips, means pivotally connecting the adjacent end portions of said strips to permit the latter to fan out when bowed lengthwise, a fabric member fastened to the strips and covering the frame when the latter is expanded by bowing and fanning the strips, a clamp attached to each end portion of the frame for fastening the expanded frame to a telephone cable, or the like, a vertical standard, means for fastening the upper end portion of the standard to one of said clamps, and means for vertically adjustably fastening the standard to the platform of a cableman's tower truck.

3. A telephone cableman's tent, comprising an expansible and collapsible frame formed of one long and two short strips, means for pivotally connecting the ends of the short strips in superimposed relation to the long strip to permit the strips to fan out when bowed lengthwise in expanding the frame, a flexible covering for the frame, a C-shaped clamp attached to each end portion of the long frame strip for fastening the expanded frame to a telephone cable, or the like, a C-shaped sleeve for receiving and clamping a side piece of a ladder resting against the cable, and means for fastening the sleeve to one of the frame clamps.

4. A telephone cableman's tent, comprising an expansible and collapsible frame formed of one long and two short strips, means for pivotally connecting the ends of the short strips in superimposed relation to the long strip to permit the strips to fan out when bowed lengthwise in expanding the frame, a flexible covering for the frame, a C-shaped clamp attached to each end portion of the long frame strip for fastening the expanded frame to a telephone cable, or the like, a standard, means for fastening the upper end portion of the standard to one of the C-shaped clamps, and means for vertically adjustably fastening the standard to a cableman's tower.

5. A telephone cableman's tent, comprising an expansible and collapsible frame formed of a plurality of substantially coextensive, superimposed flexible strips, means pivotally connecting the adjacent end portions of said strips to permit the strips to fan out when bowed lengthwise, a fabric member fastened to the strips and covering the frame when the latter is expanded by bowing and fanning the strips, means connected to the strips to hold the frame expanded and permit collapsing thereof, a clamp attached to each end portion of the frame for fastening the expanded frame to a telephone cable having its axis arranged in parallel relation with the axis of the pivotal connection between the said strips, and means secured to one of said clamps to adjustably connect the tent frame to a support on which a cableman may stand and to thereby connect the support to the cable.

6. A telephone cableman's tent, comprising an expansible and collapsible frame formed of a plurality of substantially coextensive, longitudinally superimposed flexible strips, means pivotally connecting the adjacent end portions of said strips to permit the strips to fan out when bowed lengthwise, a fabric member fastened to the strips and covering the frame when the latter is expanded by bowing and fanning the strips, toggle joints connected to the strips to hold the frame expanded and to permit collapsing thereof, a clamp pivotally attached to each end portion of the frame for fastening the expanded frame to a telephone cable having its axis arranged in parallel relation with the axis of the pivotal connection between each clamp and its associated end portion of the frame, means for holding the expanded frame in any one of three pivotally adjusted positions relative to the clamps, and means detachably secured to one of the clamps to adjustably connect the tent frame to a support on which a cableman may stand and to thereby connect the support to the cable.

7. A telephone cableman's tent, comprising an expansible and collapsible frame formed of one long and two relatively short longitudinally flexible strips, means for pivotally connecting the ends of the short strips in superimposed relation to the long strip to permit the strips to fan out when they are all bowed lengthwise in expanding the frame, a flexible cover for the frame, a C-shaped clamp for fastening each end portion of the expanded frame to a telephone cable having its axis arranged in parallel relation with the axis of the pivotal connection between the said frame strips, each clamp having a groove to receive the associated end portion of the long frame strip, and means for connecting said end portion to pivot about an axis arranged in parallel relation with the telephone cable.

8. A telephone cableman's tent, comprising an expansible and collapsible frame formed of one relatively long and two shorter longitudinally flexible strips, means for pivotally connecting the ends of the shorter strips in superimposed relation to the long strip to permit the strips to fan out when all of the strips are bowed lengthwise in expanding the frame, a flexible cover for the frame, a C-shaped clamp for fastening each end portion of the expanded frame to a telephone cable having its axis arranged in parallel relation with the axis of the pivotal connection between the said frame strips, each clamp having a V-shaped groove to receive the associated end portion of the long frame strip, means for pivotally connecting said end portion in the groove, and a plurality of members passing through the groove for holding the expanded frame in any one of three pivotally adjusted positions relative to the C-shaped clamps.

References Cited in the file of this patent

UNITED STATES PATENTS

| | | |
|---|---|---|
| 1,827,427 | Fincher | Oct. 13, 1931 |
| 1,941,902 | Lewis | Jan. 2, 1934 |
| 1,966,561 | Ratta, Jr. | July 17, 1934 |
| 2,014,336 | Marthaler | Sept. 10, 1935 |
| 2,483,953 | Weiner et al. | Oct. 4, 1949 |
| 2,513,411 | Heil | July 4, 1950 |
| 2,528,721 | Brockman et al. | Nov. 7, 1950 |
| 2,571,362 | Hewey | Oct. 16, 1951 |

FOREIGN PATENTS

| | | |
|---|---|---|
| 5,789 | Denmark | July 13, 1903 |
| 339,820 | Italy | Apr. 29, 1936 |